United States Patent
Sephton

[15] 3,648,754
[45] Mar. 14, 1972

[54] VORTEX FLOW PROCESS AND APPARATUS FOR ENHANCING INTERFACIAL SURFACE AND HEAT AND MASS TRANSFER

[72] Inventor: Hugo H. Sephton, Berkeley, Calif. 94707
[22] Filed: July 28, 1969
[21] Appl. No.: 845,311

Related U.S. Application Data

[63] Continuation of Ser. No. 673,075, Oct. 5, 1967, Pat. No. 3,457,982.

[52] U.S. Cl. .................159/13 A, 210/23, 210/304, 210/321
[51] Int. Cl. ..................B01d 1/22, B01d 13/00, B01d 21/00
[58] Field of Search.................159/28, 13 A; 210/23, 304, 210/321, 323; 165/109, 109 T, 174, 177

[56] References Cited

UNITED STATES PATENTS

| | | | |
|---|---|---|---|
| 2,433,741 | 12/1947 | Crawford | 55/16 |
| 2,788,125 | 4/1957 | Webb | 210/23 X |
| 3,396,103 | 8/1968 | Huntington | 210/23 |
| 3,407,871 | 10/1968 | Penney | 165/109 X |

FOREIGN PATENTS OR APPLICATIONS

| | | | |
|---|---|---|---|
| 13,461 | 1909 | Great Britain | 165/177 |
| 14,165 | 1915 | Great Britain | 165/177 |
| 596,912 | 4/1960 | Canada | 159/2 MS |
| 748,562 | 5/1956 | Great Britain | 165/177 |
| 795,120 | 5/1958 | Great Britain | 165/177 |
| 942,846 | 11/1963 | Great Britain | 159/28 |

*Primary Examiner*—Norman Yudkoff
*Assistant Examiner*—J. Sofer
*Attorney*—Thomas F. Smegal, Jr. and Townsend and Townsend

[57] ABSTRACT

In tubular flow channels for heat or mass transfer between or with components of a fluid, a helically twisted ribbon baffle is axially disposed, anchored at the upstream end and floating within the flow channel for imposing vortex flow within a central core of the fluid passed therethrough. The flow channel wall comprises a porous filtration medium for through transmission or for retention of selected fluid components.

10 Claims, 7 Drawing Figures

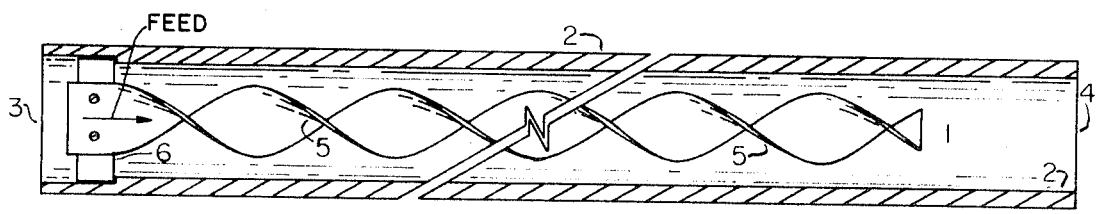
FIG. I
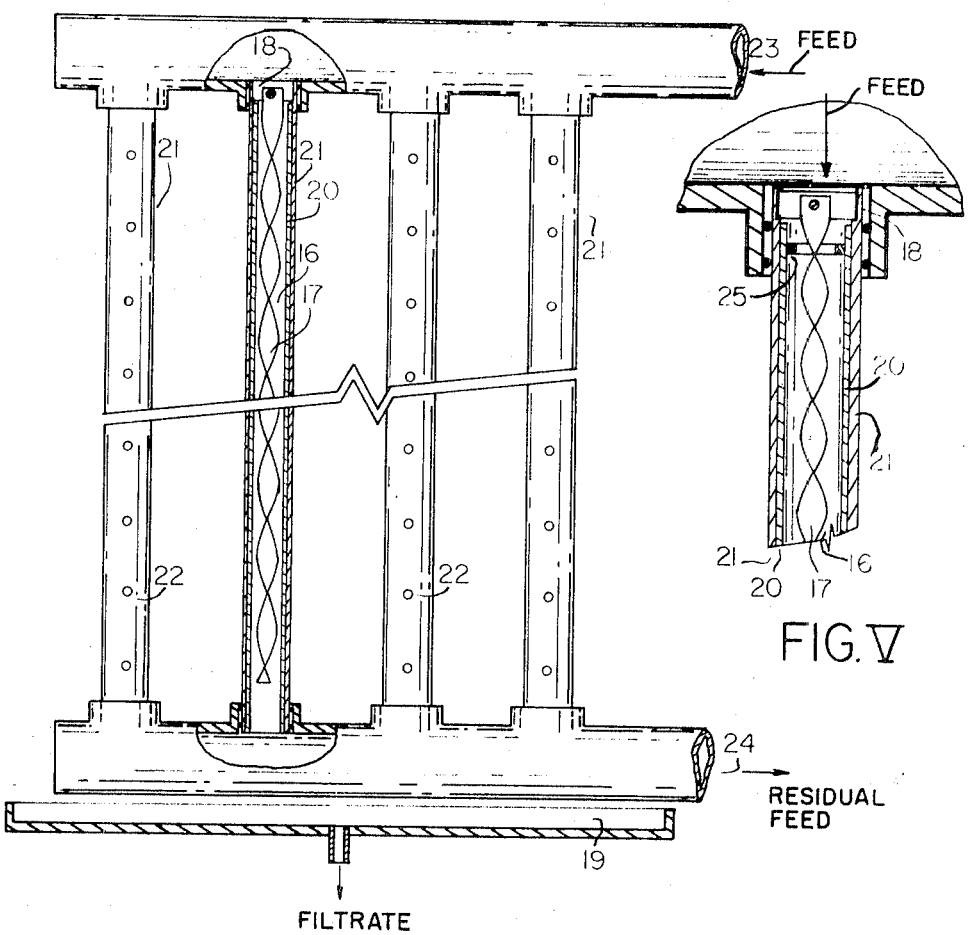
FIG. III
FIG. V

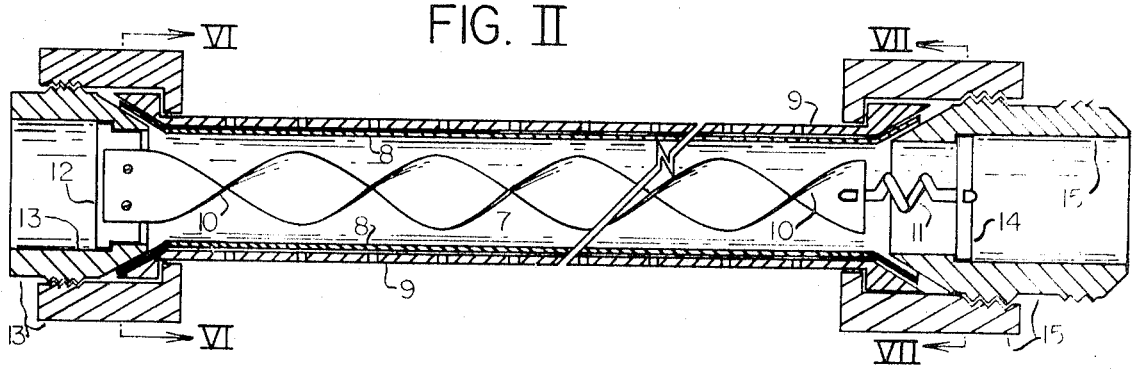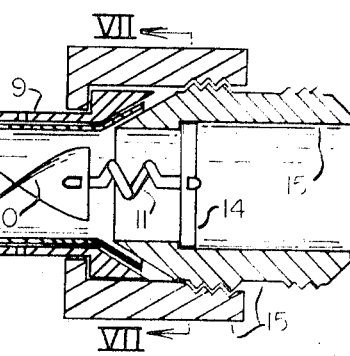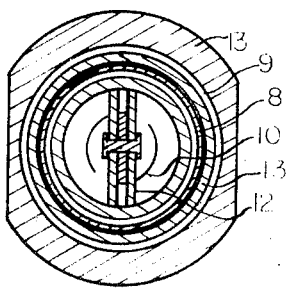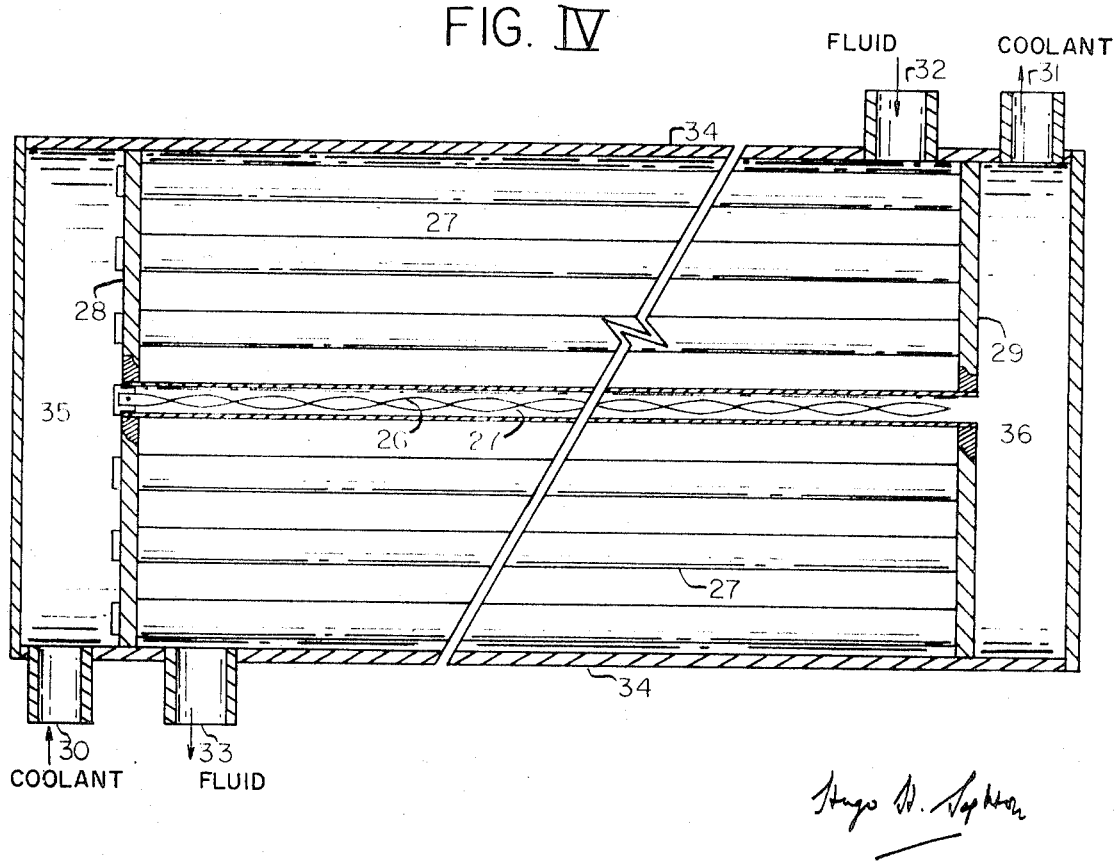

VORTEX FLOW PROCESS AND APPARATUS FOR ENHANCING INTERFACIAL SURFACE AND HEAT AND MASS TRANSFER

This application is a continuation-in-part of copending application Ser. No. 673,075, filed Oct. 5, 1967, now U.S. Pat. No. 3,457,982 entitled Evaporation and Distillation Apparatus and of its divisional case Ser. No. 594,165, filed Nov. 14, 1966, now U.S. Pat. No. 3,423,294, entitled Vortex Flow Film Distillation Process.

In summary, this specification deals with fluid flow control by vortex flow imposed within a tubular channel or a multiplicity of such parallel channels. One purpose of this vortex flow is to enhance interfacial surface or contact, to facilitate or increase mass or heat transfer at an interface, for instance the interface between fluid and channel wall. The means for imposing vortex flow control is helically twisted baffle or insert for the flow channel, comprising a twisted ribbonlike helix of a width substantially less than the internal dimension of the flow channel and disposed axially therein so that an unobstructed gap for fluid flow around the edges of the baffle and between these and the tube inner wall is thereby provided. The helix may be of even or gradient pitch length i.e., a pitch length that varies at a consistent rate over the length of the helix. In addition, the helix may be of constant or variable width to provide for various vortex flow intensities as required by a variety of process conditions. The helical baffle can be anchored centrally at the upstream end of the channel and the fluid flow be utilized to center it throughout the channel. Vortex flow imposed by the baffle tends to center it in the channel and the slight tensioning effect on the helix provided by fluid viscosity effects also helps in this regard. The flow channel may be oriented anywhere from horizontal to vertical with up or downflow and may be used under zero gravity conditions. When oriented vertically and with downward flow of fluid further tensioning of the helix can be obtained from gravity effects on the helix or by a weight suspended from its downstream end (or its upstream end in the case of upflow).

One of the purposes of this helical insert in tubular flow channels is to enhance solvent flux (mass transfer) when applied to tubular reverse osmosis or hyperfiltration channels and another is to enhance heat transfer when used in heat exchangers. Another purpose is to enhance mass transfer (and heat transfer) when used in wet wall columns for liquid gas reactions, dissolutions or gas stripping applications.

This specification makes provision for:
a. Interfacial surface enhancement by imposing vortex flow within a fluid flow channel by a helical insert disposed axially within the channel and anchored at the upstream end.
b. Solvent flux enhancement through a tubular hyperfiltration or reverse osmosis membrane by a helical insert as under (a).
c. Solvent flux enhancement through a tubular hyperfiltration membrane by a helical insert that it tensioned and anchored or supported at both ends thereof so as to be axially disposed in the flow channel.
d. Heat and mass transfer enhancement with helical inserts as under (a).

Preferred embodiments and modes of operation are illustrated by the following Figures and descriptions:

FIG. I: A side view section of tubular channel for vortex flow, having a floating helical insert anchored at the upstream end.

FIG. II: A side view section of a hyperfiltration channel having a helical baffle disposed axially therein, mounted at both ends thereof under tension.

FIG. III: A side view part section of a multiplicity of vertical vortex flow channels for downflow use in hyperfiltration.

FIG. IV: A side view section of a multiplicity of vortex flow channels with a multiplicity of helical baffles anchored at the upstream ends thereof, comprising a heat exchanger.

FIG. V: Detail of FIG. III showing construction and 'O'-ring sealing.

FIG. VI: Inlet end section view of FIG. II.

FIG. VII: Outlet end section view of FIG. II.

FIG. I shows schematically a fluid flow channel 1 bounded by a tube wall 2 having a fluid inlet end 3 and an outlet end 4. A helically twisted ribbonlike baffle 5 made from a ribbon of any suitable material, having a twisted configuration around its center line, is axially disposed within the channel 1, secured centrally within the channel at the upstream end thereof by a suitable support, for instance by securing it to a rod or riveted between a pair of flat plates 6 of which one is shown 6 spanning the tube internal dimension and supported by the tube wall. The baffle material may be a thin metallic ribbon of lightweight or it may be of plastic material for instance a plastic having a density approximately equal to that of the fluid passed through the channel. The vortex flow imposed in the fluid channel tends to center the helix therein. Fluid viscosity effects provide for slight tension that also helps to maintain the floating helix 5 centrally within the channel 1. The rotary component of flow is primarily imposed upon the fluid in the core region of the flow channel and is thence transmitted to the annular region around the edges of the helix by fluid shear or viscosity effects. The intensity of the vortex imposed, and the degree of separation by centrifugal force obtained and the degree of mixing between the core region and the annular region will depend on the helix width and pitch length in addition to the axial flow velocity, fluid viscosity effects and density range of the components of the fluid. Flow conditions can thus be selected or optimized for any process need by selecting a helical insert of the appropriate material and width and pitch length.

Provision can also be made to allow the floating helix to rotate by anchoring it rotatably at the upstream end of the flow channel only. Such a helix can be useful in cases where the fluid flow rate decreases downstream along the channel, for instance when mass transfer occurs across the channel wall.

FIG. II illustrates the use of vortex flow in a hyperfiltration or reverse osmosis channel 7 provided by a solvent permeable membrane 8 supported inside a suitable perforated tubular support 9; a helically twisted vortex-inducing baffle 10 is disposed axially within the channel 7 supported at either end under moderate tension, for instance as provided by a spring 11. The upstream end of the helix is for instance supported centrally in the channel riveted between a pair of metal plates of which one is shown 12 fitting into and abutting a shoulder in a pipe connector 13 to the support tube 9. The down stream end of the helix is for instance supported with a tensioning spring 11 supported centrally within the channel 7 by means of a rod 14 spanning the channel and supported by a shoulder in the outlet pipe connector 15.

It is implied that the helical baffle can be used in a hyperfiltration or reverse osmosis channel similar to that of FIG. I, but having wall perforations and a helical baffle that is anchored centrally in the channel at it upstream end only; the fluid flowing through the channel and the vortex flow imposed there is then utilized to center the helical baffle within the remainder of this channel. Such a floating helix can be made from a variety of materials, for instance plastics having approximately the same density as the fluid passed through the channel so as to facilitate floating the helix in mid-channel. In this case moderate tension to keep the helix centered in the channel is derived from fluid viscosity effects rather than by anchoring the helix under tension at both ends thereof and it simplifies installation or removal of the helix for the purpose of cleaning out the channel or replacing the membrane or other parts.

In operation a fluid to be filtered or desalinated is passed through the channel under elevated pressure so as to force solvent through the membrane, for instance a cellulose acetate membrane designed to allow passage of water but to reject salts, and to cause solutes and suspended matter to be concentrated in the fluid remaining within the channel. A concentration gradient is thus created radially within the channel with the highest concentration of solutes or suspended matter at the membrane surface. This solute gradient causes an osmotic back pressure or overpressure that can significantly reduce the rate of flow of solvent through the membrane at a particular applied feed pressure. One of the purposes of the vortex flow imposed is to reduce or thin out this concentration layer adjacent the membrane surface and to agitate it by fluid shear effects so as to enhance solvent flux at the applied feed pressure. Another purpose of the helical insert is to provide for increased solvent flux through the membrane tube along its entire length by adjusting the rotary component of flow and the thinning out effect on the concentration layer by means of varying the pitch length and the width of the helical baffle so as to be responsive to the flow rate decrease and to the gradual solute concentration increase in the axial flow direction along the channel.

FIG. III shows a multiplicity of parallel vertical tubular hyperfiltration channels 16 with helical inserts 17 anchored centrally at their top or fluid inlet ends 18, and extending downward substantially the length of these flow channels. The helical inserts 17 are substantially narrower than the internal dimension of the tubular flow channels 16 so as to provide obstruction-free gaps for fluid flow between the edges of these helices and the internal walls of the channels 16. The force of fluid flow, and the effect of the vortex imposed are primarily relied upon to center the helices throughout the length of the flow channels, but gravity will also aid in this regard in the case of a vertical downflow orientation. The apparatus of FIG. III may also be used in horizontal or other orientations. A trough 19 can be used to collect the desalinated water or other filtered solvent produced. The tubular channels are defined by a tubular hyperfiltration membrane 20 supported within a pressurizable support tube 21 having perforations 22 to allow passage of the product filtered through the membrane 20. The tubes 21 can be connected in parallel between tube sheets or for instance to header tubes as shown serving as an inlet distribution tube 23 and an outlet collector 24 tube. The membrane support tubes 21 can be connected to the distributor tubes by means of 'O'-ring seals, and the membrane 20 can be sealed by means of an expansion ring 25 pressing it to the support tube wall 21 as shown in FIG. V, the detail sketch of FIG. III. The helical baffles can be supported as shown, riveted between a pair of flat plates fitting tightly into the inlet end of the support tube 21.

FIG. IV illustrates the use of the helical baffle 26 in a multiplicity of parallel flow channels 27 or tubes in a tubular heat exchanger comprising, in combination, tube support plates or tube sheets 28, 29, coolant inlet 30 and outlet 31 conduits, fluid inlet 32 and outlet 33 conduits, a cylindrical vessel or jacket 34, a coolant inlet vessel 35 and a coolant outlet vessel 36. The helical baffle 26 can be mounted coaxially in the fluid flow channel by anchoring it at each end thereof under moderate tension or it can be anchored at the inlet end of the fluid flow channel only as shown. Fluid viscosity effects and the vortex flow imposed are in this latter case effective in centering the floating helix in the flow channel 27. It is to be understood that the fluid and the coolant passed in heat exchange relationship through the heat exchanger of FIG. IV may be interchanged so that heat will pass from the fluid flowing through the flow channels 27 to the fluid flowing through the jacket 34.

In operation, a fluid to be cooled is passed through the heat exchanger jacket 34 from inlet 32 to the outlet conduit 33 thereto and heat is transferred from this fluid through the walls of the tubes 27 to a coolant passed through these tubes. This heat may be transferred as heat of condensation as in the case when steam is condensed on the outside walls of the tubes 27 or as sensible heat such as in the case when a fluid is thereby cooled to a lower temperature. A coolant fluid can be passed from the inlet 30 to the outlet 31 through the heat exchanger tubes 27 in single pass parallel flow as provided for by the apparatus of FIG. IV or in double or multiple pass flow by means of a different fluid distribution or channeling arrangement. The coolant fluid flowing through the tubes 27 is induced into vortex flow of a single axial symmetry by imposing a rotary component of flow upon the axial flow as this flow is deflected by the helical baffle 26. This rotary flow superimposed upon the axial flow results in a helicoidal flow pattern throughout the channel being transmitted to a fluid layer in contact with the tube wall. This produces enhancement of the interfacial surface area between the coolant fluid and the heat transfer surface, effectively increasing the contact route of the fluid over this surface and results in enhancement of the rate of heat transferred from the tube wall to the coolant fluid. Operation of the heat exchanger in horizontal, vertical or any other orientation and under zero gravity conditions is implied. Coolants having various fluid properties and relative viscosities are intended to be covered by this specification. The helical insert is especially useful for the purpose of improving the heat transfer coefficients in existing heat exchangers or in adapting and optimizing pre-existing heat exchangers for cooling or heating special fluids, for instance viscous fluids, with high thermal efficiency. The helical insert thus provides process flexibility and adaptability for heat exchangers of standard type and size.

The applications of vortex flow discussed in this specification are intended to serve as examples only and a wider scope is implied for this specification, as indicated by the following claims.

The invention claimed is:

1. An apparatus for modifying and controlling the flow of fluid within a tubular channel having a channel wall and an inlet end and an outlet end for flowing a fluid therethrough, a helically twisted, continuous, ribbonlike baffle disposed axially within said tubular channel, said baffle being of a width less than the width of said channel wall so that an unobstructed gap for fluid flow is provided between the edges of said baffle and said channel wall, said channel wall comprising a filtration medium adapted for retaining a first component of said fluid while allowing a second component of said fluid to pass through said filtration medium, means for mounting said baffle centrally at about the inlet end of said channel and means for maintaining said baffle under tension and axially within said channel whereby when fluid is introduced into said inlet end and along said baffle, said baffle will cause vortex flow of said fluid.

2. Apparatus in accordance with claim 1 wherein said means for maintaining said baffle under tension and axially within said channel comprises said flowing fluid interacting with said baffle.

3. Apparatus in accordance with claim 1 wherein said means for maintaining said baffle under tension and axially within said channel comprises a tensioning support mounting said baffle centrally within said channel near the outlet end of said channel.

4. Apparatus in accordance with claim 1 wherein said means for mounting said baffle centrally about the inlet end of said channel comprises a rotatable anchor, providing for the rotation of said baffle within said channel and about the axis thereof.

5. Apparatus in accordance with claim 1 wherein said baffle has a variable width along the axial direction thereof.

6. Apparatus in accordance with claim 1 wherein said baffle has a variable pitch length along the axial direction thereof.

7. Apparatus in accordance with claim 1 wherein said baffle is made from a material having a density approximately equal to the density of said fluid flowing through said channel.

8. Apparatus in accordance with claim 1 wherein said wall comprises a hyper-filtration membrane within a perforated tubular support.

9. Apparatus in accordance with claim 8 and further characterized by a multiplicity of such tubular supports in generally parallel orientation.

10. Apparatus in accordance with claim 8, wherein the pitch length and the width of said baffle are varied to provide for an increase of the rate of flow of said second component of said fluid through said hyperfiltration membrane.

* * * * *